US011075691B2

(12) United States Patent
Loheit et al.

(10) Patent No.: US 11,075,691 B2
(45) Date of Patent: Jul. 27, 2021

(54) MARTIAN SYNCHRONOUS SATELLITE CONSTELLATION FOR EARTH COMMUNICATIONS

(71) Applicant: The Boeing Company, Chicago, IL (US)

(72) Inventors: Kurt W. Loheit, Rancho Palos Verdes, CA (US); Matthew G. Richards, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/195,715

(22) Filed: Nov. 19, 2018

(65) Prior Publication Data
US 2020/0162151 A1  May 21, 2020

(51) Int. Cl.
*H04B 7/185* (2006.01)
*H04B 7/195* (2006.01)
*H04B 7/19* (2006.01)

(52) U.S. Cl.
CPC .......... *H04B 7/18521* (2013.01); *H04B 7/19* (2013.01); *H04B 7/195* (2013.01)

(58) Field of Classification Search
CPC .. H04B 7/185; H04B 7/1851; H04B 7/18513; H04B 7/18515; H04B 7/18521
USPC ............................. 455/427, 428, 12.1, 13.1
See application file for complete search history.

(56) References Cited

U.S. PATENT DOCUMENTS

| 5,582,367 A * | 12/1996 | Castiel ................ B64G 1/1007 244/158.4 |
| 2012/0203877 A1* | 8/2012 | Bartholomay ...... H04L 41/0813 709/221 |

OTHER PUBLICATIONS

De Sanctis et al "Space System Architectures For Interplanetary Internet", IEEE Aerospace Conference ISBN 978-1-4244-3887-7, Mar. 1, 2010 (Year: 2010).*
Wang et al, Protocols for reliable data transport in space internet, IEEE Communications Surveys and Tutorials, vol. 11, issue 2, Apr. 1, 2009 (Year: 2009).*
Lock et al ("Small Areostationary Telecommunications Orbiter Concepts for Mars in the 2020s" 2016 IEE Aerospace Conference pp. 1-12, May 1, 2016) (Year: 2016).*
Bell, David J. et al.; "Mars Network: A Mars Orbiting Communications & Navigation Satellite Constellation"; 0-7803-5846-5/00 2000 IEEE, NASA Jet Propulsion Laboratory, pp. 75-87, Mar. 25, 2000.

* cited by examiner

*Primary Examiner* — Philip Sobutka
(74) *Attorney, Agent, or Firm* — Haynes and Boone, LLP

(57) ABSTRACT

Systems, methods, and apparatus for a constellation design for a Martian synchronous orbit are disclosed. In one or more embodiments, a system for communications comprises at least one antenna on Mars in communication with at least one Martian satellite. In one or more embodiments, at least one Martian satellite is located in an areosynchronous orbit (ASO) around Mars. The system further comprises at least one Martian satellite in communication with at least one antenna on Earth. In at least one embodiment, at least one Martian satellite is part of a Martian areosynchronous satellite constellation, which comprises a total of at least four Martian satellites. In some embodiments, the areosynchronous orbit (ASO) is an areostationary orbit.

21 Claims, 7 Drawing Sheets

MARTIAN SYNCHRONOUS SATELLITE CONSTELLATION FOR EARTH COMMUNICATIONS

FIELD

The present disclosure relates to satellites. In particular, the present disclosure relates to a constellation design of satellites for a Martian synchronous orbit.

BACKGROUND

Currently, constant communication from Earth to the surface of the planet Mars is not possible. Current systems utilize a single-point relay, non-synchronous Martian satellite that is located between Mars and Earth. The relay satellite is used to relay signals transmitted from Mars to Earth and signals transmitted from Earth to Mars. If a communication antenna on Mars is located in a position on the surface of Mars that happens to not be in a field of view encompassing the relay satellite at that time of day (e.g., the communication antenna is located on the back side of the planet Mars, which is not facing Earth), communication to Earth is not possible at that time because the communication antenna will be unable to directly transmit (or receive) a signal towards (or from) the relay satellite. Communication to Earth from Mars will not be possible until the communication antenna has either physically moved (e.g., via a rover vehicle) to a position on Mars that is within a field of view encompassing the relay satellite or until the plant Mars has rotated such that the communication antenna is located within a field of view encompassing the relay satellite.

In light of the foregoing, there is a need for an improved communication design that allows for constant communication from Earth to the surface of Mars.

SUMMARY

The present disclosure relates to a method, system, and apparatus for a constellation design for a Martian synchronous orbit. In one or more embodiments, a method for communications comprises transmitting, from at least one antenna on Mars, at least one signal to at least one Martian satellite. In one or more embodiments, at least one Martian satellite is orbiting in an areosynchronous orbit (ASO) around Mars. The method further comprises transmitting, from at least one Martian satellite, at least one signal. Further, the method comprises receiving, by at least one antenna on Earth, at least one signal.

In one or more embodiments, the method further comprises transmitting, from at least one Earth satellite, at least one signal towards Earth. In at least one embodiment, at least one Earth satellite is a geosynchronous Earth orbit (GEO) satellite or a non-geosynchronous Earth orbit (NGEO) satellite.

In at least one embodiment, the areosynchronous orbit (ASO) is an areostationary orbit. In some embodiments, at least one Martian satellite is part of a Martian areosynchronous satellite constellation, which comprises a total of at least four Martian satellites.

In one or more embodiments, the method further comprises transmitting, by at least one other Martian satellite in the Martian areosynchronous satellite constellation, at least one signal.

In at least one embodiment, at least one antenna on Mars is mobile or stationary. In some embodiments, at least one signal is transmitted within a data layer of a protocol stack of a communications architecture. In one or more embodiments, at least one antenna on Earth is mobile or stationary.

In one or more embodiments, a method for communications comprises transmitting, from at least one antenna on Earth, at least one signal. The method further comprises transmitting, from at least one Martian satellite orbiting in an areosynchronous orbit (ASO) around Mars, at least one signal. Further, the method comprises receiving, by at least one antenna on Mars, at least one signal.

In at least one embodiment, the method further comprises transmitting, from at least one Earth satellite, at least one signal towards Mars.

In one or more embodiments, a system for communications comprises at least one antenna on Mars in communication with at least one Martian satellite. In at least one embodiment, at least one Martian satellite is located in an areosynchronous orbit (ASO) around Mars. Further, the system comprises at least one Martian satellite in communication with at least one antenna on Earth.

In at least one embodiment, at least one Martian satellite is in communication with at least one antenna on Earth via at least one Earth satellite.

In one or more embodiments, at least one Martian satellite is part of a Martian areosynchronous satellite constellation, which comprises a total of at least four Martian satellites.

In at least one embodiment, at least one Martian satellite is in communication with at least one other Martian satellite in the Martian areosynchronous satellite constellation.

In one or more embodiments, at least one Martian satellite is in communication with at least one antenna on Earth via at least one other Martian satellite in the Martian areosynchronous satellite constellation.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
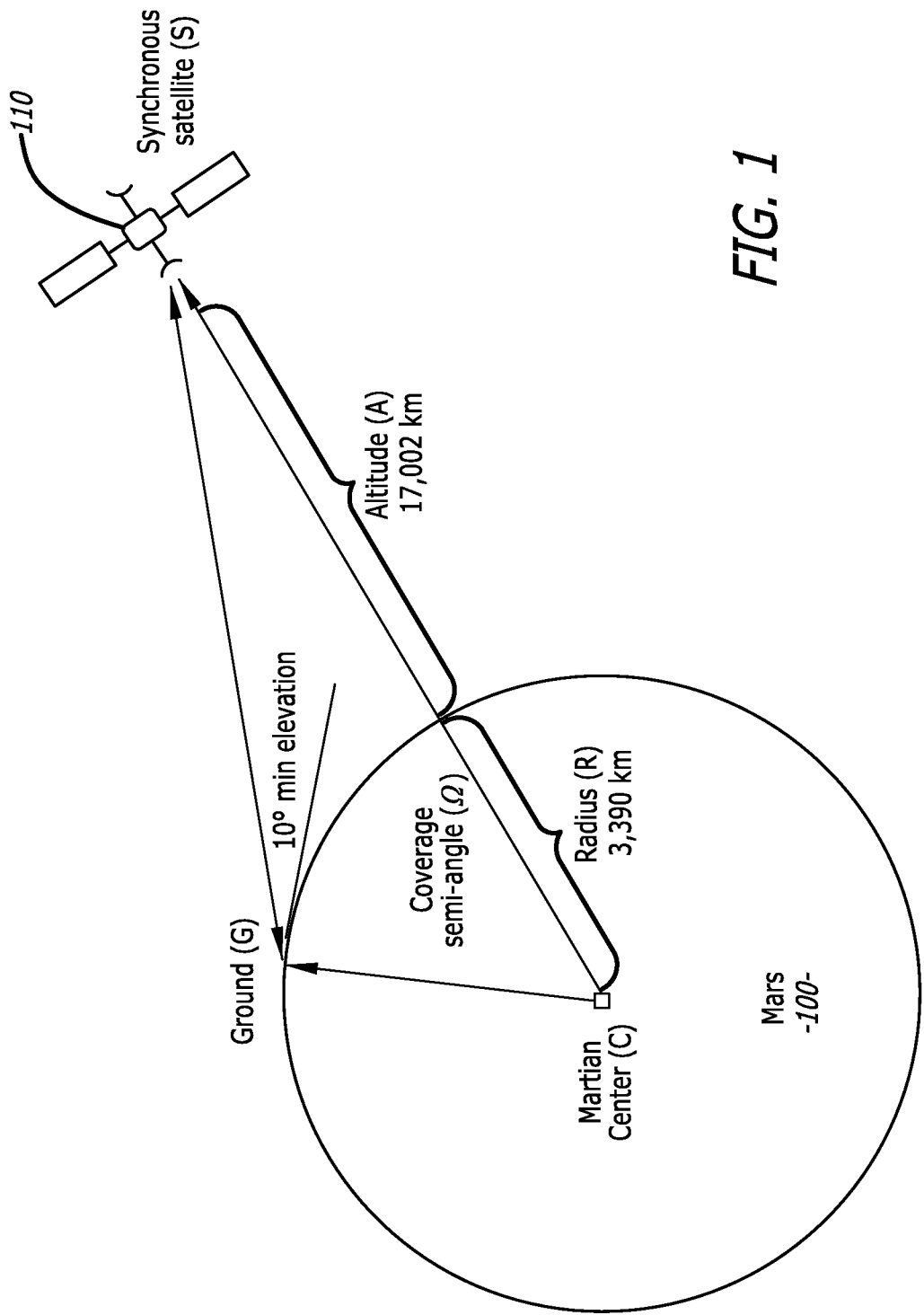
FIG. 1 is a diagram showing the geometry for a Martian satellite in relation to Mars for the disclosed constellation design for a Martian synchronous orbit, in accordance with at least one embodiment of the present disclosure.

The methods and apparatus disclosed herein provide an operative system for a constellation design for a Martian synchronous orbit. In one or more embodiments, the system of the present disclosure comprises an areosynchronous (ASO) Martian satellite constellation comprising at least four Martian satellites. The disclosed Martian satellite constellation allows for constant communication between Earth and Mars.

As previously mentioned above, currently, constant communication from Earth to the surface of the planet Mars is not possible. Current systems utilize a single-point relay, non-synchronous Martian satellite that is located between Mars and Earth. The relay satellite is used to relay signals transmitted from Mars to Earth and signals transmitted from Earth to Mars. If a communication antenna on Mars is located in a position on the surface of Mars that happens to not be in a field of view encompassing the relay satellite at that time of day (e.g., the communication antenna is located on the back side of the planet Mars, which is not facing Earth), communication to Earth is not possible at that time because the communication antenna will be unable to directly transmit (or receive) a signal towards (or from) the relay satellite. Communication to Earth from Mars will not be possible until the communication antenna has either physically moved (e.g., via a rover vehicle) to a position on Mars that is within a field of view encompassing the relay satellite or until the plant Mars has rotated such that the communication antenna is located within a field of view encompassing the relay satellite.

The disclosed architecture provides an interconnected synchronous Martian satellite constellation around the planet Mars to support infrastructure for constant planetary and interplanetary communications from the Martian surface (and optionally from an Earth satellite constellation) to Earth. This architecture comprises four synchronous Martian satellites, which when orbiting in a stationary orbit, provide full-Martian longitudinal coverage and latitude coverage between ±50° latitudes. The four synchronous Martian satellites are connected to each other via an inter-satellite link communication system that provides full duplex operation between each individual Martian satellite. Each of the individual Martian satellites in the constellation has the ability to communicate back to Earth as a relay link to Earth-based satellites or direct to Earth-based ground sites. The synchronous Martian satellite architecture permits persistent communications between remote nodes (e.g., antennas on Mars and antennas on Earth) within the provided latitude/longitude of satellite coverage acting as a backbone for voice, video, and data connectivity.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to satellites, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

I. Orbits

Synchronous orbits are orbits that allow for satellites to revolve around planets within the same period of time that it takes for a planet to rotate around itself. When a synchronous orbit has an inclination and eccentricity of zero, satellites will appear "stationary" from a fixed point on the rotating planetary body.

A geosynchronous Earth orbit (GEO) is an orbit around Earth of a satellite with an orbital period that matches Earth's rotation on its axis, which takes one sidereal day (i.e. 23 hours, 56 minutes, and 4 seconds). A special case of geosynchronous orbit is the geostationary orbit, which is a circular geosynchronous orbit inclined 0° to Earth's equatorial plane (that is, directly above the Equator). A satellite in a geostationary orbit appears stationary, always at the same point in the sky, to observers on the surface of Earth. Currently, geosynchronous satellites above Earth offer significant utility to commercial, military, and civil users. A non-geosynchronous Earth orbit (NGEO) is an orbit around Earth that is not at a geosynchronous orbit.

Areosynchronous orbits (ASO) are a class of synchronous orbits around the planet Mars. As with all synchronous orbits, an areosynchronous orbit has an orbital period equal in length to the primary's (e.g., Mars') sidereal day. A satellite in areosynchronous orbit does not necessarily maintain a fixed position in the sky as seen by an observer on the surface of Mars. However, such a satellite will return to the same apparent position every Martian day. An areostationary orbit, which is a special case of areosynchronous orbit, is a circular areosynchronous orbit in the Martian equatorial plane. A satellite in areostationary orbit will appear stationary to observers on the surface of Mars.

Future synchronous (e.g., areosynchronous) satellites above Mars are envisioned by the present disclosure to provide persistent communication for robotic and human surface exploration on Mars. Benefits of the disclosed system include: (1) when orbiting in an areostationary orbit, Martian global coverage from the equator to high latitudes of Mars to allow for communication among science, manned, and unmanned mission elements on the Martian surface, (2) a relay backbone to Earth without the need for direct Mars-to-Earth link hardware, and (3) increased capacity for voice, data, and video transmissions to and from Mars.

II. Calculations for Systems

For the system of the present disclosure, an orbit altitude and velocity that provide synchronous orbits (e.g., areosynchronous orbits) for Mars is first determined. Such orbits are achieved when the gravitational force on a satellite is equal to the centripetal force producing acceleration:

$$\frac{G(m_1)(m_2)}{r^2} = \frac{(m_1)V^2}{r},$$

where G is the universal gravitational constant ($6.674 \times 10^{-11}$ m$^3$/kgs$^2$), m$_1$ is the mass of the satellite, m$_2$ is the mass of the planet, r is the semi-major axis of a synchronous orbit, and V is the velocity of the satellite. Satellite velocity is defined as the circumference of the orbit ($2\pi r$) divided by the period (T). Applying this definition and simplifying terms, the radius of a synchronous orbit can be expressed as:

$$r = \sqrt[3]{\frac{Gm_2T^2}{4\pi^2}},$$

where Martian planetary mass is $6.4185 \times 10^{23}$ kilograms (kg), and T is 88,400 seconds (s). Accordingly, the Martian synchronous orbit semi-major axis is 20,392 kilometers (km). Given the planetary radius of 3,390 kilometers (refer to FIG. 1), the Martian synchronous orbit altitude is approximately 17,002 kilometers (e.g., for areosynchronous orbits) (refer to FIG. 1). And, the synchronous orbital velocity is calculated as 1.449 km/s. FIG. 1 is a diagram showing the geometry for a Martian satellite 110 in relation to Mars 100 for the disclosed constellation design for a Martian synchronous orbit, in accordance with at least one embodiment of the present disclosure. In this figure, the radius (R) of Mars 100 of 3,390 km is shown. In addition, the altitude (A) of 17,002 km for the Martian satellite 110, which is orbiting in an areosynchronous orbit, is shown.

Next, after the orbit altitude and velocity that provide synchronous orbits for Mars is determined, the number of satellites (e.g., when orbiting in an areostationary orbit above the Mars equator) to provide coverage of all Martian longitudes with a minimum elevation angle of 10 degrees (°) is determined. For this determination, the coverage semi-angle Ω of an individual satellite as defined by the intersection of lines extending from the Mars center to a ground reference point (CG) and synchronous satellite (CS) is calculated by applying the law of cosines as follows: CS$^2$=CG$^2$+GS$^2$−2CG×GS×cos(CGS). Given that CS is 20,392 km, CG is 3390 km, and the CGS angle is 100°, GS can be solved as: 415,833,644=11,492,100+GS$^2$−6780×GS×(−0.1736), with GS equal to 19,528 km. Next, Ω is calculated by the law of sines as follows:

$$\frac{GS}{\sin(\Omega)} = \frac{CS}{\sin(CGS)}.$$

Applying GS, CS, and the CGS angle, semi-angle Ω is solved as 50.6°. Accordingly, a synchronous satellite can cover 2Ω longitude or 101°. As such, to ensure contiguous 360° longitudinal coverage, a total of four (4) satellites are required in the constellation.

The benefits of the four satellite synchronous relay constellation, when orbiting in an areostationary orbit, include continuous access to both the Martian surface between ±50° latitudes and the Earth-based relay satellites and ground stations. With Mars completing a rotation every 24.6 hours, line-of-sight access is less than 50% when accounting for grazing or interference with the elevation angle. Furthermore, the relays experience a daily occultation of the Mars-to-Earth link by Mars itself as individual orbiters pass behind Mars from Earth's perspective. Therefore, the four synchronous satellites are connected to each other via an inter-satellite link communication system that provides full duplex operation between each individual satellite.

III. System Configurations

Figure 2:
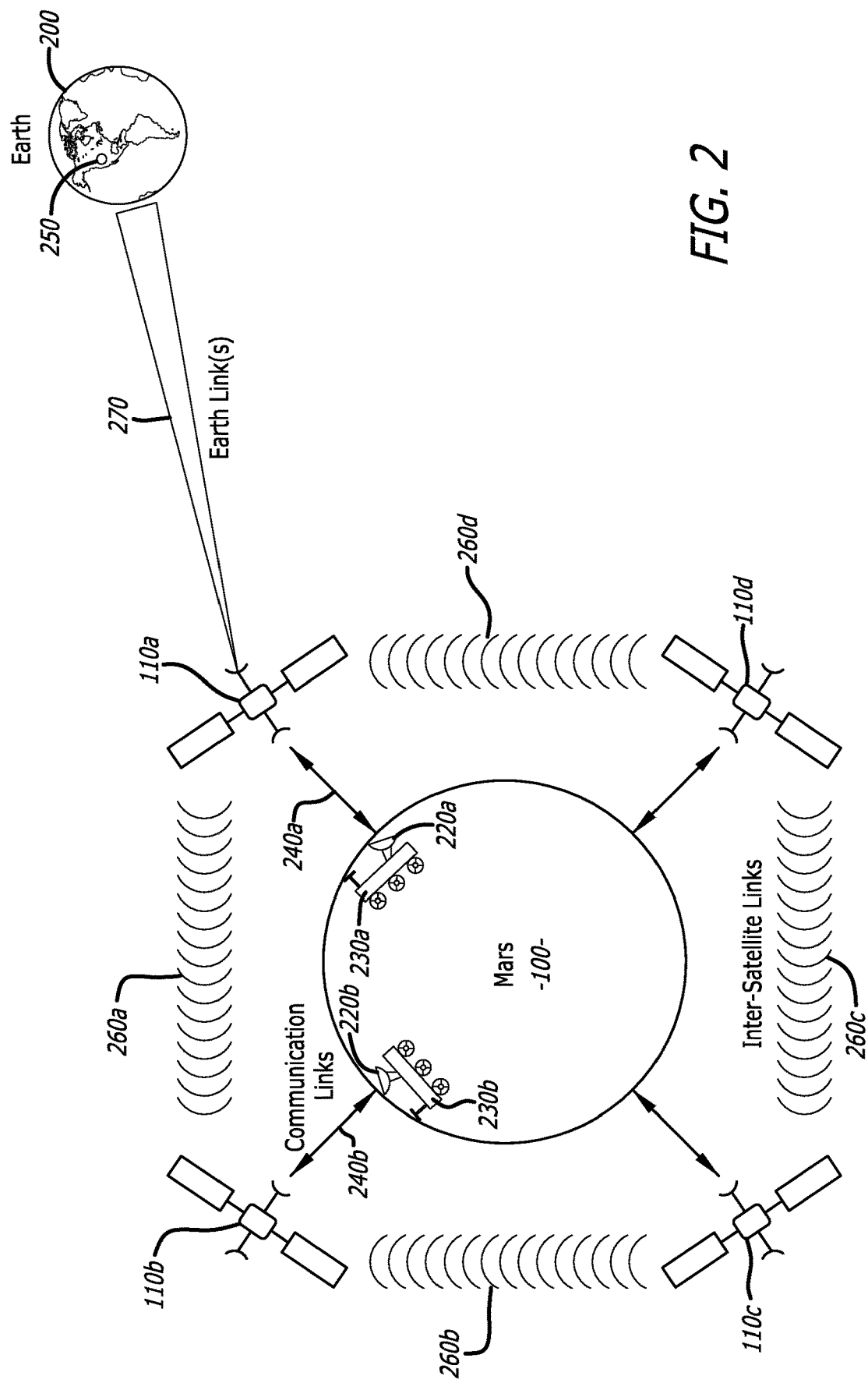
FIG. 2 is a diagram showing the system for the disclosed constellation design for a Martian synchronous orbit, where a signal(s) is directly transmitted from a Martian satellite to Earth, in accordance with at least one embodiment of the present disclosure.
Figure 3:
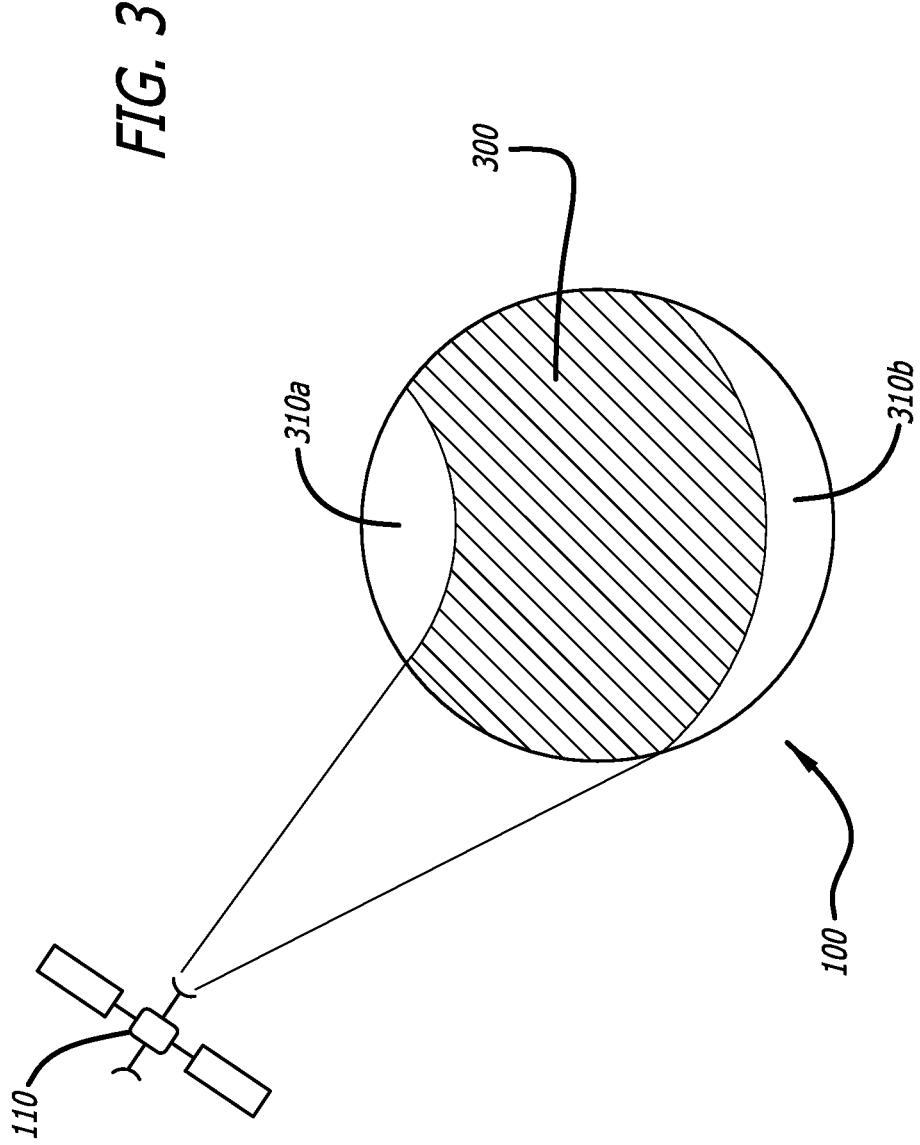
FIG. 3 is a diagram showing the coverage area on Mars provided by a Martian satellite in areostationary orbit for the disclosed constellation design for a Martian synchronous orbit, in accordance with at least one embodiment of the present disclosure.

FIG. 2 is a diagram showing the system for the disclosed constellation design for a Martian synchronous orbit, where a signal(s) (e.g., an Earth link(s)) 270 is directly transmitted from a Martian satellite 110a to Earth 200, in accordance with at least one embodiment of the present disclosure. In this figure, the planets Mars 100 and Earth 200 are shown. Also shown are four Martian satellites 110a-d orbiting Mars 100 in an areostationary orbit (i.e. an areosynchronous orbit around the Martian equator) at approximately 17,002 kilometers above the surface of Mars 100. The four Martian satellites 110a-d (e.g., the antennas on the Martian satellites 110a-d) provide contiguous 360° longitudinal coverage (e.g., antenna gain coverage) around Mars 100, excluding the north pole 310a and south pole 310b of Mars 100 (refer to FIG. 3). FIG. 3 is a diagram showing the coverage area 300 on Mars 100 provided by a Martian satellite 110 in areostationary orbit for the disclosed constellation design for a Martian synchronous orbit, in accordance with at least one embodiment of the present disclosure.

It should be noted that in order to provide contiguous 360° longitudinal coverage around Mars 100, at least four areosynchronous Martian satellites are needed. However, in other embodiments, more or less than four areosynchronous Martian satellites may be employed by the disclosed system. In addition, it should be noted that although the Martian satellites 110a-d shown in FIG. 2 are orbiting Mars 100 in an areostationary orbit (i.e. a type of areosynchronous orbit), in other embodiments, the Martian satellites 110a-d may be orbiting Mars 100 in various other areosynchronous orbits other than an areostationary orbit as is shown. When the Martian satellites 110a-d are orbiting Mars 100 in other areosynchronous orbits other than an areostationary orbit, the Martian satellites 110a-d will continue to provide contiguous 360° longitudinal coverage around Mars 100; however depending upon the orbit inclination, the specific coverage area on Mars 100 will be different than the coverage area 300 shown in FIG. 3.

Referring back to FIG. 2, also shown are two rovers (e.g., mobile Mars vehicles) 220a, 220b located on the surface of Mars 100. Each rover 220a, 220b comprises an antenna (e.g., a parabolic antenna) 230a, 230b used for transmitting and receiving data to and from the rover 220a, 220b. It should be noted that in other embodiments, the rovers 220a, 220b may each comprise more than one antenna 230a, 230b than as shown in FIG. 2. In addition, it should be noted that in other embodiments, antennas used for transmitting and receiving data to and from Mars 100 may be stationary antennas (e.g., antennas associated with a Martian ground station) located on the surface of Mars 100.

During operation of the disclosed system for the transmission of a signal(s) 240a from rover 230a on Mars 100 to Earth 200, the antenna 220a on the rover 230a on the surface of Mars 100 transmits a signal(s) (e.g., communication link(s)) 240a, which may comprise Mars research data, to Martian satellite 110a (e.g., to an antenna on Martian satellite 110a). Martian satellite 110a operates as a relay by transmitting the signal(s) 270 (signal(s) 270 comprises the same data as signal(s) 240a) to an antenna 250 (e.g., a parabolic antenna) on Earth 200. It should be noted that in one or more embodiments, the antenna 250 on Earth 200 may be a mobile antenna (e.g., an antenna mounted on a vehicle, such as a terrestrial vehicle, marine vehicle, or airborne vehicle operating in Earth's atmosphere) or a stationary antenna (e.g., an antenna associated with an Earth ground station).

And, during operation of the disclosed system for the transmission of a signal(s) 270 from Earth 200 to Mars 100, the antenna 250 on Earth 200 transmits the signal(s) 270 to the Martian satellite 110a. Martian satellite 110a operates as a relay by transmitting the signal(s) 240a to the antenna 220a on the rover 230a on the surface of Mars 100.

During operation of the disclosed system for the transmission of a signal(s) 240b from rover 230b on Mars 100 to Earth 200, the antenna 220b on the rover 230b on the surface of Mars 100 transmits a signal(s) (e.g., communication link(s)) 240b, which may comprise Mars research data, to Martian satellite 110b (e.g., to an antenna on Martian satellite 110b). Since rover 230b is located on the back side of Mars 100, Earth 200 is not within the field of view (FOV) of Martian satellite 110b, which is the field of view of antenna 220b on rover 230b and, as such, Martian satellite 110b operates as a relay by transmitting the signal(s) 260a (signal(s) 260a comprises the same data as signal(s) 240b) to Martian satellite 110a, which has Earth 200 within its field of view. Then, Martian satellite 110a operates as a relay by transmitting the signal(s) 270 (signal(s) 270 comprises the same data as signal(s) 240b and 260a) directly to antenna 250 (e.g., a parabolic antenna) on Earth 200.

Also, during operation of the disclosed system for the transmission of a signal(s) 270 from Earth 200 to Mars 100, the antenna 250 on Earth 200 transmits the signal(s) 270 to the Martian satellite 110a. Martian satellite 110a operates as a relay by transmitting the signal(s) 260a to Martian satellite 110b. Then, Martian satellite 110b operates as a relay by transmitting the signal(s) 240b to the antenna 220b on the rover 230b on the surface of Mars 100.

It should be noted that all of the Martian satellites 110a-d in the constellation shown in FIG. 2 may also operate as relays by transmitting signals 260a-d to each other via satellite cross-links between each other.

Figure 4:
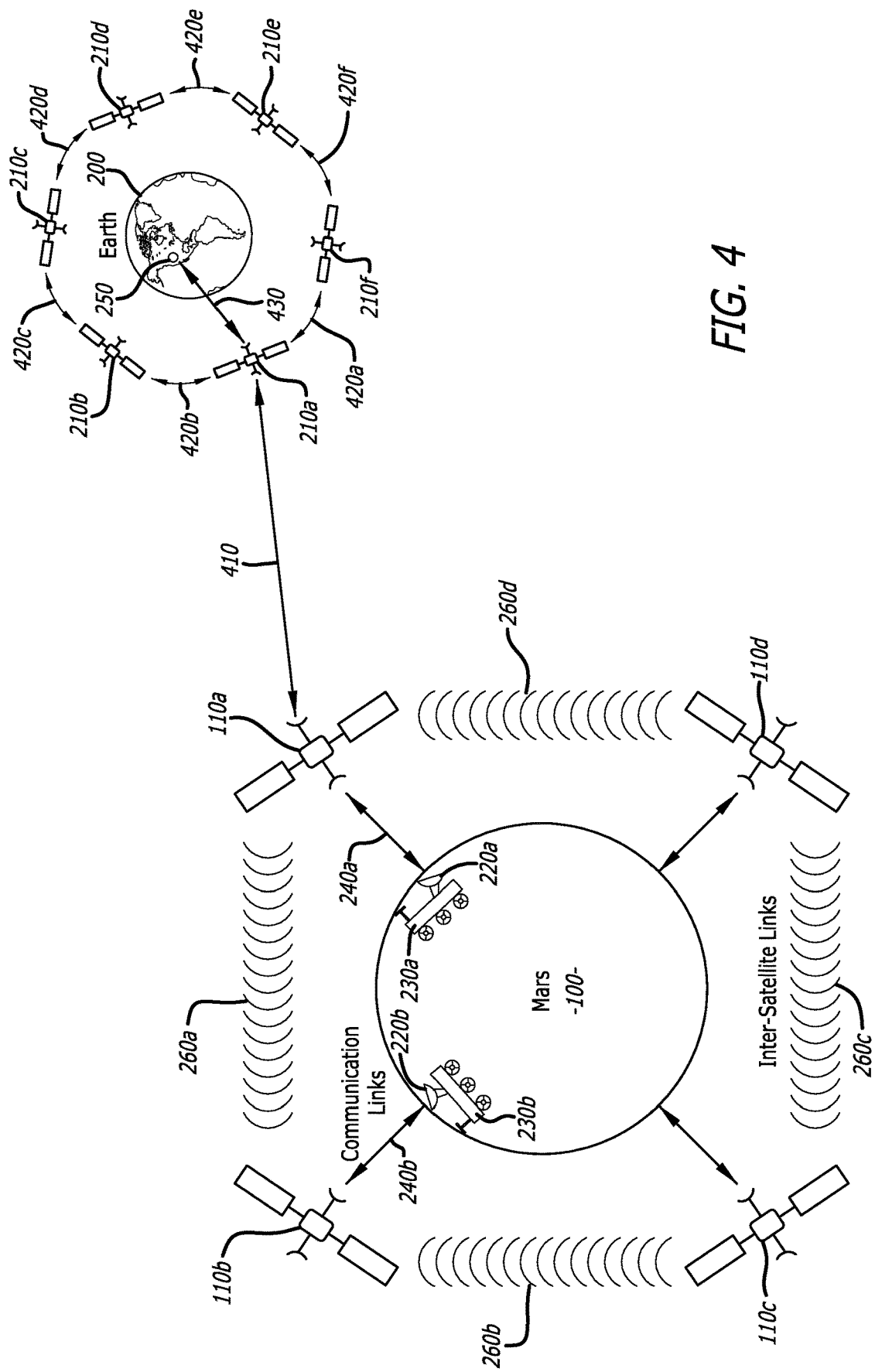
FIG. 4 is a diagram showing the system for the disclosed constellation design for a Martian synchronous orbit, where a signal(s) is transmitted from a Martian satellite to Earth via an Earth satellite, in accordance with at least one embodiment of the present disclosure.

FIG. 4 is a diagram showing the system for the disclosed constellation design for a Martian synchronous orbit, where a signal(s) 410 is transmitted from a Martian satellite 110a to Earth 200 via an Earth satellite 210a, in accordance with at least one embodiment of the present disclosure. The system in FIG. 4 is the same as the system in FIG. 2, except that the system in FIG. 4 additionally comprises a constellation of Earth satellites 210a-f. In FIG. 4, the Earth satellites 210a-f are shown orbiting Earth 200 in a geostationary orbit (i.e. a geosynchronous orbit around Earth's equator). The six Earth satellites 210a-f each comprise an antenna(s) to provide coverage (e.g., antenna gain coverage) on Earth 200. It should be noted that although the Earth satellites 210a-f shown in FIG. 4 are orbiting Earth 200 in a geostationary orbit (i.e. a type of geosynchronous orbit), in other embodiments, the Earth satellites 210a-f may be orbiting Earth 200 in various other geosynchronous orbits other than a geostationary orbit as is shown. In addition, in some embodiments, the Earth satellites 210a-f may be orbiting Earth 200 in various other orbits other than a geosynchronous orbit, such as a non-geosynchronous orbit (NGEO). Additionally, it should be noted that in some embodiments, more or less than six Earth satellites 210a-f may be employed by the disclosed system. Also, it should be noted that all of the Earth satellites 210a-f in the constellation shown in FIG. 4 may also operate as relays by transmitting signals 420a-f to each other via satellite cross-links between each other.

During operation of the disclosed system for the transmission of a signal(s) 240a from rover 230a on Mars 100 to Earth 200, the antenna 220a on the rover 230a on the surface of Mars 100 transmits a signal(s) (e.g., communication link(s)) 240a, which may comprise Mars research data, to Martian satellite 110a (e.g., to an antenna on Martian satellite 110a). Martian satellite 110a operates as a relay by transmitting the signal(s) 410 (signal(s) 410 comprises the same data as signal(s) 240a) to an Earth satellite 210a. The Earth satellite 210a then acts as a relay by transmitting a signal(s) 430 (signal(s) 430 comprises the same data as signal(s) 410 and 240a) to an antenna 250 (e.g., a parabolic antenna) on Earth 200.

And, during operation of the disclosed system for the transmission of a signal(s) 410 from Earth 200 to Mars 100, the antenna 250 on Earth 200 transmits the signal(s) 430 to the Earth satellite 210a. The Earth satellite 210a then operates as a relay by transmitting the signal(s) 410 to the Martian satellite 110a. Martian satellite 110a operates as a relay by transmitting the signal(s) 240a to the antenna 220a on the rover 230a on the surface of Mars 100.

During operation of the disclosed system for the transmission of a signal(s) 240b from rover 230b on Mars 100 to Earth 200, the antenna 220b on the rover 230b on the surface of Mars 100 transmits a signal(s) (e.g., communication link(s)) 240b, which may comprise Mars research data, to Martian satellite 110b (e.g., to an antenna on Martian satellite 110b). Since rover 230b is located on the back side of Mars 100, Earth 200 is not within the field of view (FOV) of Martian satellite 110b, which is the field of view of antenna 220b on rover 230b and, as such, Martian satellite 110b operates as a relay by transmitting the signal(s) 260a (signal(s) 260a comprises the same data as signal(s) 240b) to Martian satellite 110a, which has Earth 200 within its field of view. Then, Martian satellite 110a operates as a relay by transmitting the signal(s) 410 (signal(s) 410 comprises the same data as signal(s) 240b and 260a) to Earth satellite 210a. Earth satellite 210a operates as a relay by transmitting the signal(s) 430 (signal(s) 430 comprises the same data as signals(s) 410, 240b, and 260a) to antenna 250 (e.g., a parabolic antenna) on Earth 200.

Also, during operation of the disclosed system for the transmission of a signal(s) 410 from Earth 200 to Mars 100, the antenna 250 on Earth 200 transmits the signal(s) 430 to Earth satellite 210a. Earth satellite 210a operates as a relay by transmitting the signal(s) 410 to the Martian satellite 110a. Martian satellite 110a operates as a relay by transmitting the signal(s) 260a to Martian satellite 110b. Then, Martian satellite 110b operates as a relay by transmitting the signal(s) 240b to the antenna 220b on the rover 230b on the surface of Mars 100.

IV. Methods of Operations

Figure 5:
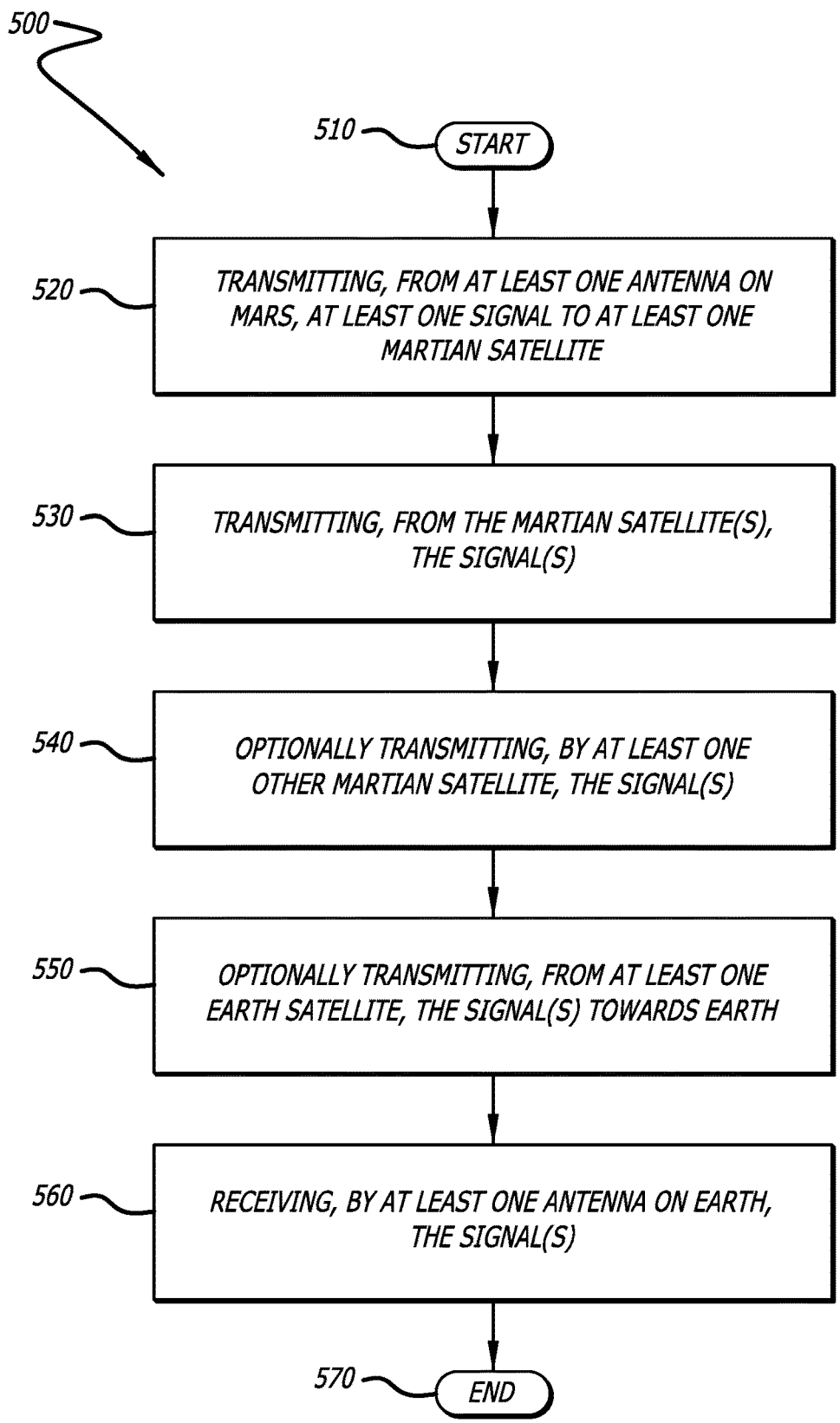
FIG. 5 is a flow chart showing a method for the disclosed constellation design for a Martian synchronous orbit, where a signal(s) is transmitted from Mars to Earth, in accordance with at least one embodiment of the present disclosure.

FIG. 5 is a flow chart showing a method 500 for the disclosed constellation design for a Martian synchronous orbit, where a signal(s) is transmitted from Mars to Earth, in accordance with at least one embodiment of the present disclosure. At the start 510 of the method 500, at least one antenna on Mars transmits at least one signal to at least one Martian satellite 520. Then, the Martian satellite(s) transmits the signal(s) 530. At least one other Martian satellite optionally transmits the signal(s) 540. At least one Earth satellite optionally transmits the signal(s) towards Earth 550. Then, at least one antenna on Earth receives the signal(s) 560. Then, the method 500 ends 570.

Figure 6:
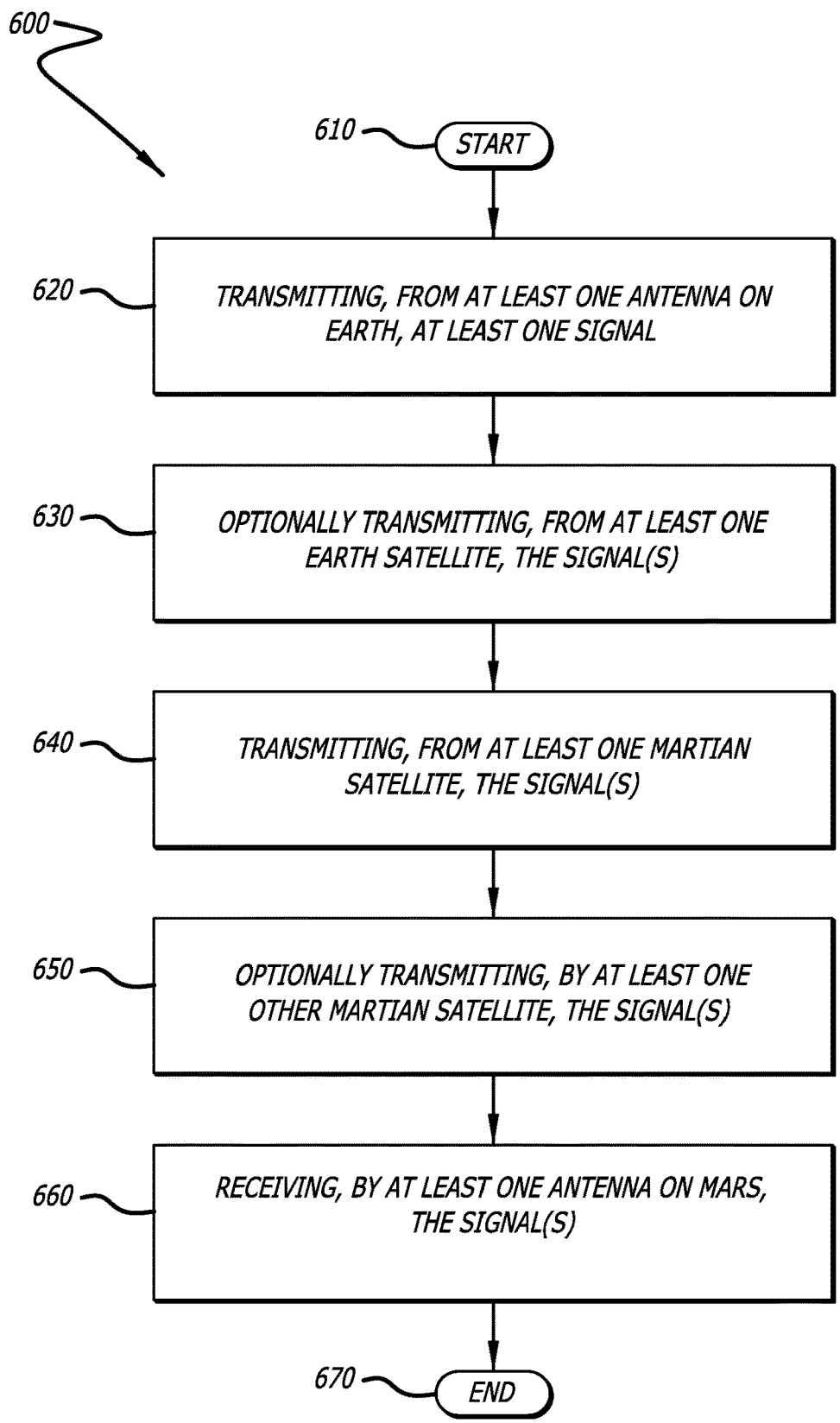
FIG. 6 is a flow chart showing a method for the disclosed constellation design for a Martian synchronous orbit, where a signal(s) is transmitted from Earth to Mars, in accordance with at least one embodiment of the present disclosure.

FIG. 6 is a flow chart showing a method 600 for the disclosed constellation design for a Martian synchronous orbit, where a signal(s) is transmitted from Earth to Mars, in accordance with at least one embodiment of the present disclosure. At the start 610 of the method 600, at least one antenna on Earth transmits at least one signal 620. At least one Earth satellite optionally transmits the signal(s) 630. Then, at least one Martian satellite transmits the signal(s) 640. At least one other Martian satellite optionally transmits the signal(s) 650. Then, at least one antenna on Mars receives the signal(s) 660. Then, the method 600 ends 670.

V. Communications Architecture

From a communications architecture perspective, the two planets (e.g., Mars and Earth) can be considered as two nodes in a link, each having independent "users" on each planet surface. Multiple synchronous satellites (e.g., Earth satellites and Mars satellites) can also be considered to be nodes. Due to the orbit and rotation of each planetary node (e.g., Mars and Earth), the communication link between Earth and Mars appears as a non-coherent link architecture as the actual Earth node-to-Mars node is non-stationary creating communication drop-outs. In order to create a persistent link between Earth and Mars, a seamless hand-off of communications links between planetary nodes is required. An analogy of this communication architecture would be similar to a cell phone architecture. Cell phones are mobile devices that hand off connectivity as the cell phone moves between fixed cell towers. This handoff is transparent to the cell phone user. In the interplanetary architecture, the synchronous satellite nodes (e.g., Mars satellites and Earth satellites) look like mobile users to each other. As such, they require a similar handoff as is used by a cellular architecture. The only difference is that there are no fixed cell towers between the two "mobile" nodes (e.g., Mars satellites and Earth satellites). This is an important difference as a fixed cell tower aggregates all the communication signals and connects them to the next cell tower for distribution to other mobile users in that cell via a fixed point-to-point link. Two rotating bodies do not have a fixed point-to-point option, as such the disclosed link contains Earth ground users-to-geosynchronous Earth satellites-to-areosynchronous Mars satellites-to-Mars ground users, which may all be constantly moving.

In order to assure uninterrupted connectivity, the communication layers must contain the ability to constantly handoff through the entire chain without loss. This is accomplished at the data layer (e.g., refer to FIG. 7) within the protocol stack (e.g., refer to FIG. 7) of the communications architecture. The rationale for employing the data layer is so that communications are not bound to a single waveform type, but rather use a similar data format. The data formatting employed by the disclosed system is similar to architectures used for mobile Wi-Fi or cellular connections, where multiple users (either stationary or mobile) are able to maintain high reliability connections. Each synchronous Mars node (e.g., Mars satellite) would aggregate the terrestrially based Mars users. As the data between the Martian satellites in the synchronous Martian constellation is connected via inter-satellite links, each of the individual Martian satellites in the Martian constellation would then need to hand-off the Earth-to-Mars connection as each body (e.g., Earth and Mars) rotates. The same would be true for the Earth nodes (e.g., Earth satellites), where the inter-satellite links between the Earth satellites maintain connectivity from terrestrial Earth users or ground sites, and then provide Earth satellite to Mars satellite handoff to maintain the Earth to Mars connectivity.

Figure 7:
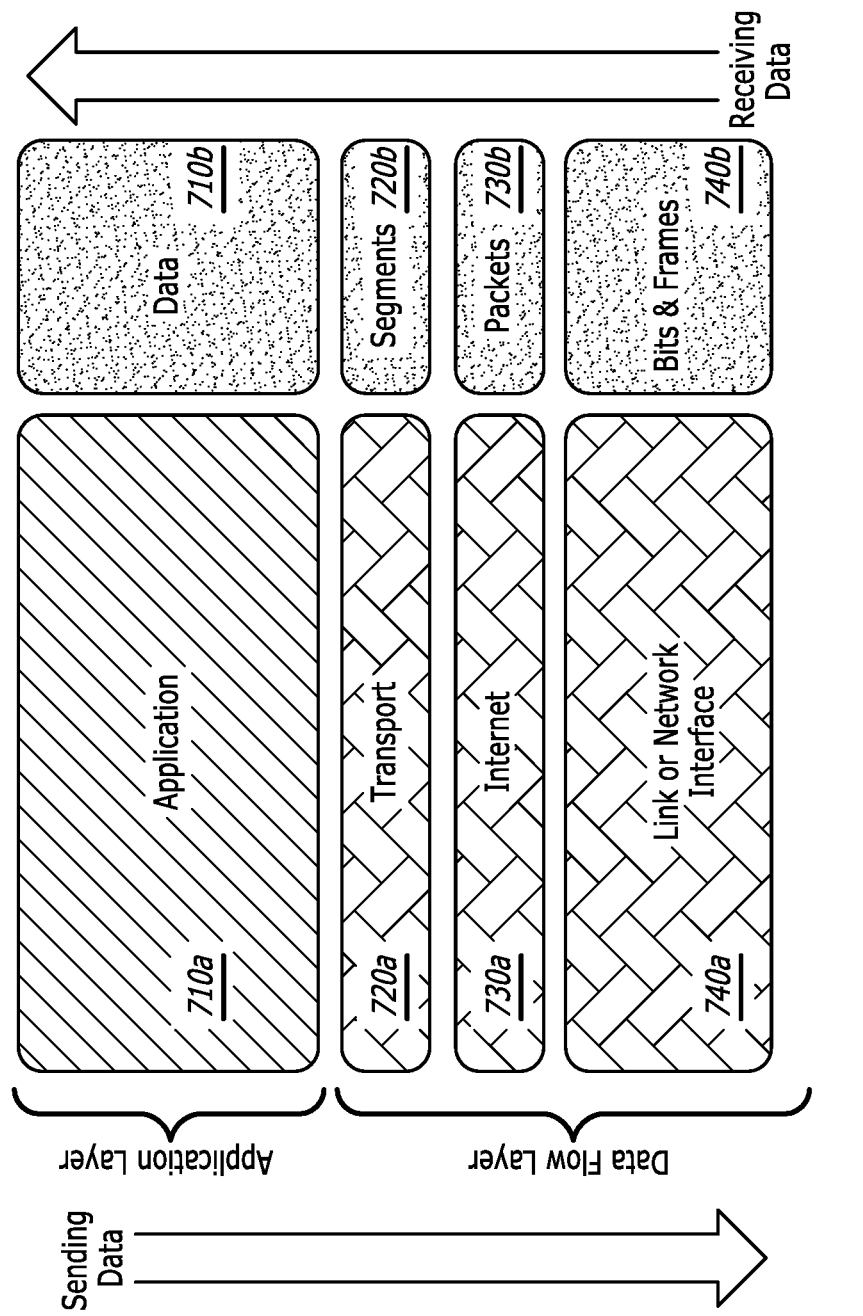
FIG. 7 is an exemplary protocol stack that may be employed for the communications for the disclosed constellation design for a Martian synchronous orbit, in accordance with at least one embodiment of the present disclosure.

FIG. 7 is an exemplary protocol stack 700 that may be employed for the communications for the disclosed constellation design for a Martian synchronous orbit, in accordance with at least one embodiment of the present disclosure. In this figure, the protocol stack 700 is shown to comprise four layers, which are the application layer (layer 4) 710*a*, the transport layer (layer 3) 720*a*, the internet layer (layer 2) 730*a*, and the link layer (layer 1) 740*a*. The application layer 710*a* deals with the exchange of data 710*b* and, as such, can be referred to as the data layer. The transport layer 720*a* handles the communication of the data (e.g., via the transmission of segments 720*b* of data 710*b*). The internet layer 730*a* carries out data packaging (e.g., into packets 730*b* of data 710*b*) and routing. The link layer 740*a* encapsulates the data packets into frames 740*b* and maps the routing addresses for the data 710*b*. It should be noted that in other embodiments, other various different types of protocol stacks comprising various different numbers of layers than protocol stack 700 as shown in FIG. 7 may be employed for the protocol stack utilized by the disclosed system.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for communications, the method comprising:
   transmitting, from at least one antenna on Mars, at least one signal;
   transmitting, from at least one Martian satellite orbiting in an inclined-circular areosynchronous orbit (ASO) around Mars, the at least one signal directly to at least one Earth satellite in an Earth satellite constellation;

receiving, by the at least one Earth satellite, the at least one signal;

transmitting, from the at least one Earth satellite, the at least one signal; and receiving, by at least one antenna on Earth, the at least one signal.

2. The method of claim 1, wherein the at least one Earth satellite is one of a geosynchronous Earth orbit (GEO) satellite or a non-geosynchronous Earth orbit (NGEO) satellite.

3. The method of claim 1, wherein the at least one Martian satellite is part of a Martian areosynchronous satellite constellation, which comprises a total of at least four Martian satellites.

4. The method of claim 3, wherein the method further comprises transmitting, by at least one other Martian satellite in the Martian areosynchronous satellite constellation, the at least one signal.

5. The method of claim 1, wherein the at least one antenna on Mars is one of mobile or stationary.

6. The method of claim 1, wherein the at least one signal is transmitted within a data layer of a protocol stack of a communications architecture.

7. The method of claim 6, wherein the data layer is an application layer of the protocol stack.

8. The method of claim 7, wherein the data layer is directly adjacent a transport layer of the protocol stack.

9. The method of claim 1, wherein the at least one antenna on Earth is one of mobile or stationary.

10. A method for communications, the method comprising:

transmitting, from at least one antenna on Earth, at least one signal;

transmitting, from at least one Earth satellite in an Earth satellite constellation, the at least one signal directly to at least one Martian satellite orbiting in an inclined-circular areosynchronous orbit (ASO) around Mars;

receiving, by the at least one Martian satellite, the at least one signal;

transmitting, from at least one Martian satellite, the at least one signal; and receiving, by at least one antenna on Mars, the at least one signal.

11. The method of claim 10, wherein the at least one Martian satellite is part of a Martian areosynchronous satellite constellation, which comprises a total of at least four Martian satellites.

12. The method of claim 11, wherein the method further comprises transmitting, by at least one other Martian satellite in the Martian areosynchronous satellite constellation, the at least one signal.

13. The method of claim 10, wherein the at least one antenna on Mars is one of mobile or stationary.

14. The method of claim 10, wherein the at least one signal is transmitted within a data layer of a protocol stack of a communications architecture.

15. A system for communications, the system comprising:

at least one antenna on Mars in communication with at least one Martian satellite, wherein the at least one Martian satellite is located in an inclined-circular areosynchronous orbit (ASO) around Mars;

at least one Earth satellite, which is in an Earth satellite constellation, directly in communication with the at least one Martian satellite; and at least one antenna on Earth in communication with the at least one Earth satellite.

16. The system of claim 15, wherein the at least one Martian satellite is part of a Martian areosynchronous satellite constellation, which comprises a total of at least four Martian satellites.

17. The system of claim 16, wherein the at least one Martian satellite is in communication with at least one other Martian satellite in the Martian areosynchronous satellite constellation.

18. The system of claim 17, wherein the at least one Martian satellite is in communication with the at least one antenna on Mars via the at least one other Martian satellite in the Martian areosynchronous satellite constellation.

19. The system of claim 15, wherein the at least one Earth satellite is in communication with at least one other Earth satellite in the Earth satellite constellation.

20. The system of claim 19, wherein the at least one Earth satellite is in communication with the at least one antenna on Earth via the at least one other Earth satellite in the Earth satellite constellation.

21. The system of claim 15, wherein the at least one Earth satellite is one of a geosynchronous Earth orbit (GEO) satellite or a non-geosynchronous Earth orbit (NGEO) satellite.

* * * * *